March 14, 1961 J. K. HELLER 2,974,679
QUICK ACTING VALVE
Original Filed Sept. 21, 1953 6 Sheets-Sheet 1

Fig. 1

INVENTOR.
JOHN K. HELLER
BY
ATTORNEY

March 14, 1961 J. K. HELLER 2,974,679
QUICK ACTING VALVE

Original Filed Sept. 21, 1953 6 Sheets-Sheet 5

Fig. 5

INVENTOR.
JOHN K. HELLER
BY
ATTORNEY

United States Patent Office 2,974,679
Patented Mar. 14, 1961

2,974,679

QUICK ACTING VALVE

John K. Heller, 271 La Questa Way, Woodside, Calif.

Original application Sept. 21, 1953, Ser. No. 381,241, now Patent No. 2,918,080, dated Dec. 22, 1959. Divided and this application Apr. 24, 1959, Ser. No. 810,148

7 Claims. (Cl. 137—490)

This invention relates to an improved quick-acting valve, whose operation depends, at least partly, on pressure differentials operating on different portions of the main valve member. This application is a division of application Serial No. 381,241, filed September 21, 1953, now Patent No. 2,918,080.

One purpose of this valve is to facilitate the control of large volumes of fluid, under pressure, by a very small pilot valve which itself can be operated with a small amount of energy. The fluid may be liquid, gas, or vapor, and the pilot valve may be operated manually, mechanically, electrically, pneumatically, hydraulically, or otherwise.

Another object of the device is to provide a relatively quick acting valve that moves rapidly from its closed position to its fully open position and also closes quickly. A fast, positive, automatic operation is achieved by making use of different pressures acting on areas of different sizes: when the total force urging the valve toward one direction is greater than the total force tending toward the other direction, that greater force will control the valve and move it to, or hold it in, its desired position. The pilot valve is so adapted that once it starts to change the direction of the controlling pressure, the pressure changes rapidly to move the valve in that other direction.

The invention enables the fluid itself to do most of the work of operating the valve, except for the actuation of the pilot valve, and in some cases the fluid may also actuate the pilot valve.

The invention is applicable also to safety relief valves, the same general principle being applied to cause the pilot valve to react to a critical fluid pressure so as to cause a quick opening of the main relief valve. As a relief valve, the invention makes it possible to use a short compact valve than can fit directly inside the tank containing the fluid. It also makes possible the use of a short spring that, in volatile liquids, may be in contact only with the vapor and need not extend into the liquid itself.

The valve of this invention is characterized also by the fact that it does not set up turbulence in the fluid being controlled, by its positive control, and by its great adaptability, low cost, and suitability to precision work.

Other objects and advantages of the invention will appear from the following description of certain preferred embodiments, selected to illustrate a few of the many particular uses to which the invention may be put.

In this invention the on-and-off valve has four principal parts: a valve body A that provides the inlet, the outlet, and the valve cylinder; a main valve member B that moves in the valve cylinder to connect the inlet with, or separate the inlet from, the outlet; a pilot valve C that controls the opening and closing of the main valve; and a plug and guide member D that closes one end of the valve cylinder against undesired leakage therethrough and also guides the movement of the pilot valve C.

Whether the pilot valve C should be controlled manually, mechanically, electrically, pneumatically, or hydraulically, will depend on what is most advantageous in the particular application. In any event, the effect of the movement of the pilot valve C is always to cause a difference in the pressures acting on the main valve B. The main valve B is so proportioned and so arranged in the valve housing A that a change of pressure produced by the pilot valve C will move the valve B to open or close the passage between the inlet and the outlet. Moreover, the initial movement of the valve B acts back on the pilot valve in such a way as to accelerate the change in pressures, so that the valve B opens and closes very quickly.

The drawings show an output control valve 200 which can open up or close off a supply of relatively high pressure gas or liquid in accordance with variations in the lower output pressure of that gas or liquid or in accordance with variations in pressure of some other gas or liquid at the same or different pressure. The controlled high pressure is turned on or off by the lower pressure with a positive snap action so that throttling and wire drawing are avoided. The device may be used alone as a direct control valve or it may be used as a pilot valve for actuating other valves or mechanisms.

The valve 200 has two main portions, an "on-pressure adjustment valve" 201 and an "off-pressure adjustment valve" 202. These parts cooperate together in a manner to be described later.

*The on-pressure adjustment valve 201*
*(see especially Fig. 6)*

Figure 6:
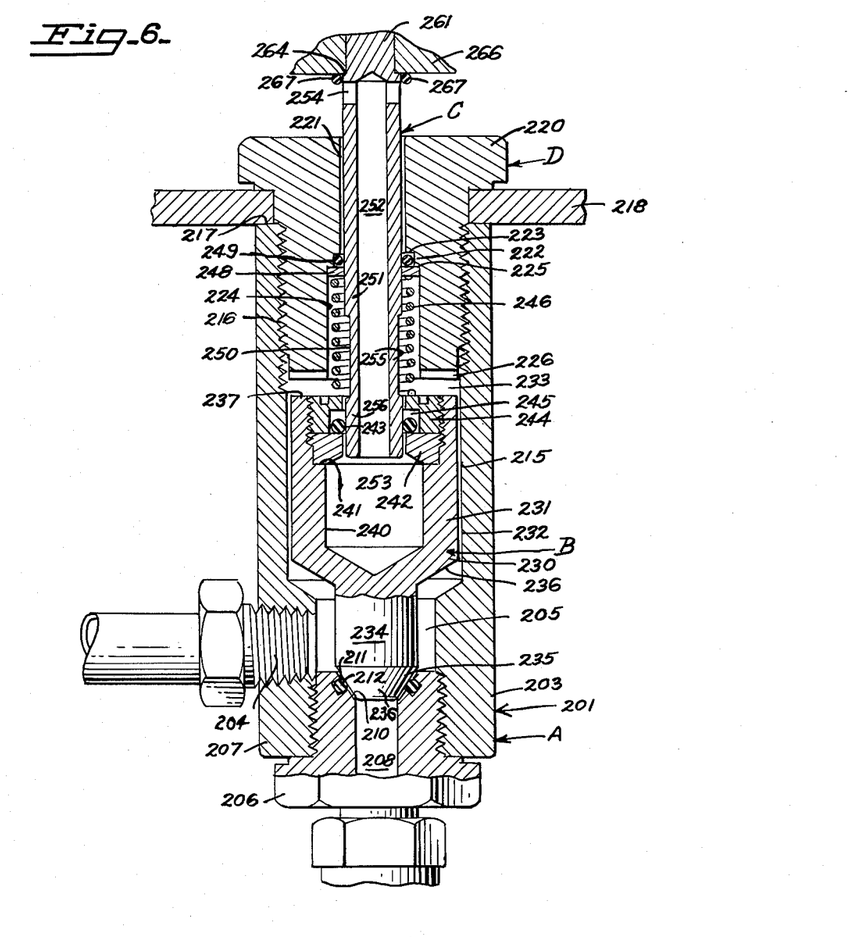
Fig. 6 is an enlarged view in elevation and in section of the on-pressure valve as shown in Fig. 1.

The on-pressure adjustment valve 201 incorporates the four main parts of this invention, namely, the valve body A, main valve B, pilot valve C, and plug-guide member D.

The valve body A in this instance comprises a generally tubular member 203 with an inlet opening 204 extending radially into a hollow central passage 205. A hollow nut 206, threaded into the lower end 207 of the body 203, has a cylindrical passage 208 that constitutes the outlet passage from the valve 201. The nut 206 preferably has a conical concave upper face 210 that serves as the valve seat for the main valve B. The seat 210 may be provided with an annular recess 211 that accommodates an O-ring 212, for better closure of the valve B.

On the opposite side of the inlet passage 204 from, and coaxial with, the outlet passage 208 is the valve cylinder 215, which is generally smooth except for its threaded upper portion 216 into which the plug D is threaded. The plug D and the upper end 217 of the cylinder 215 may secure the valve 201 to a flange 218 which, in this instance may form the lower wall of a diaphragm housing, to be discussed later.

The plug member D comprises a hollow tubular nut 220 with a stepped central passage therethrough, its narrow smooth bored passage portion 221 serving as a guide for the pilot valve C. At its lower end the passage 221 meets a wider short passage 222 at an upper annular shoulder 223. The passage 222 terminates in the still wider passage 224 whose upper (inner) end is formed by an annular shoulder 225. The lower end of the nut 220 terminates in a castellated or slotted annular shoulder 226.

The valve B in this instance comprises a metal member 230 having an upper wider diameter piston portion 231 adapted to slide in the valve cylinder 215 with sufficient clearance 232 to permit fluid to seep from the inlet 204 into the chamber 233 above the valve piston 231.

The lower narrower diameter portion 234 of the valve 230 is in this instance solid, ending in a nose 235 which normally is seated against the O-ring 212 to close off the valve 201. A generally conical shoulder 236 is the juncture between the narrower and wider diameter portions 231, 234, and it presents a surface which is utilized in the pressure equalization and pressure movement of the valve B, as is the upper annular end 237.

The piston portion 231 has a stepped recess or passage 240 having an annular shoulder 241 against which a washer 242 is inserted. An O-ring 243 is placed on the washer 242, and then an annular cup member 244 is threaded into the piston 231 and into engagement with the washer 242, a relieved or cupped portion 245 of the cup member 244 providing a recess in which the O-ring 243 is confined.

A spring 246 is compressed between the upper surface of the cup member 244 and a washer 248 which rests against the annular shoulder 225 of the nut 220. Another O-ring 249 is confined between the washer 248 and the upper shoulder 223.

The pilot valve D comprises an assembly 250 that includes an elongated stem 251, the lower two-thirds of which is hollow to provide a passageway 252 leading from the lower end 253 of the stem 250 to radial outlet openings 254. The stem 251 has a recessed peripheral spool portion 255 spaced away from its lower end 253 and joining its end portion 256. The upper O-ring sealing member 249 prevents leakage between the pilot valve stem 251 and the guide passage 221. The lower end portion 256 of the pilot valve stem 251 is normally in contact with the O-ring 243, but when the stem 251 is forced downwardly, the wider end portion 256 goes into the passage 240. The narrower recessed stem portion 255 is then opposite the O-ring 243 and not in contact with it (see Figs. 2 and 3). Fluid will then pass from the chamber 233 through the passage 240, into the hollow interior passageway 252 of the stem 250, and then out the openings 254 into the lower chamber 257 of a diaphragm valve 260.

The solid upper end portion 261 of the pilot valve stem 251 extends through a diaphragm 262 and is secured there by a nut 263. The pilot valve stem 251 may be offset just above the openings 254 to provide a shoulder 264. Between the shoulder 264 and the nut 263 are held the diaphragm 262, a diaphragm plate 265 and a diaphragm washer 266, the diaphragm 262 being mounted between the diaphragm washer 266 and the plate 265. A failure seat O-ring 267 is provided around the stem 252, for a purpose that is explained later.

A diaphragm upper housing member 268 is bolted to the lower housing member 218, the outer periphery of the diaphragm 262 being clamped between them by bolts 269. The upper housing 268 is provided with an elongated conical portion 270, in which a spring 271 is mounted. The lower end of the spring 271 bears against the diaphragm plate 265, while a collar 272 rides on the upper end of the spring 271. A pressure adjustment screw 273 is threaded into the upper extremity 274 of the conical portion 270, and the lower end 275 of the screw 273 bears against an upper cupped portion 276 of the collar 272. The screw 273 may be threaded in or out to regulate the pressure of the spring 271 against the diaphragm 262, thereby controlling the pressure at which the valve 201 is turned on. A vent 277 is provided in the upper housing 268 to keep the pressure therein at substantially the level of the outside air pressure. When the pressure exerted by the spring 271 is greater than the pressure exerted on the lower surface of the diaphragm 262 by the fluid in the closed lower chamber 257, then the pilot valve stem 251 is moved down to open the pilot valve C.

An outlet 280 leads from the lower diaphragm chamber 257 into the off pressure adjustment valve 202 which is described below.

Figure 5:
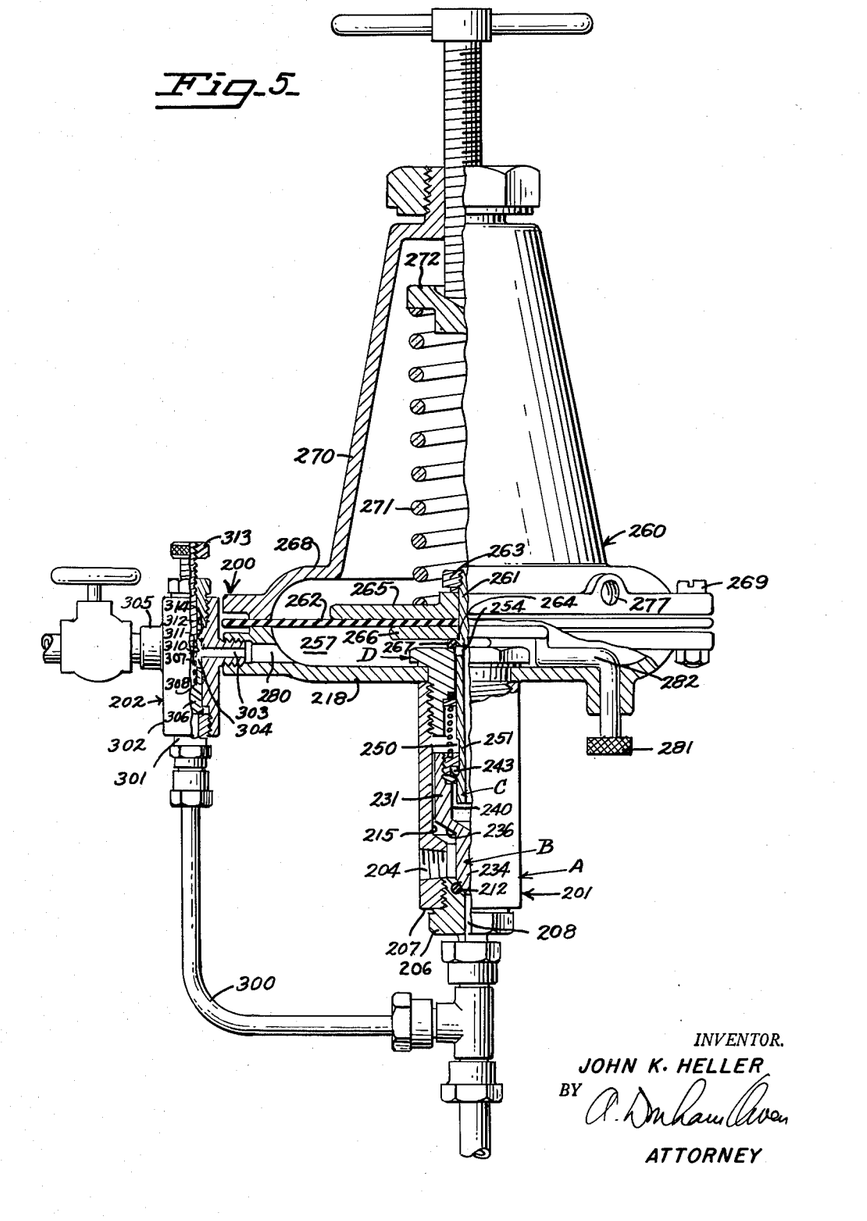
Fig. 5 is a view similar to Fig. 1 showing the valve in its closed position with the diaphragm fully collapsed.

The failure seat O-ring member 267 is adapted to seal the space between the pilot valve 250 and the plug 220 in the event of the failure of the system, so that fluid passing up through the passage 252 and out the opening 280 cannot escape into the lower chamber 257 (see Fig. 5).

For starting this system initially and for accumulating some pressure in the lower chamber, a starting button 281 is provided so that when it is pushed upwardly it actautes a lever 282 which in turn raises the diaphragm washer 266 and permits fluid to flow into the lower chamber 257. When enough pressure has been accumulated in the chamber 257, the button 281 may be released, and from then on, operation is automatic.

*Operation of the on pressure adjustment valve*

Figure 1:
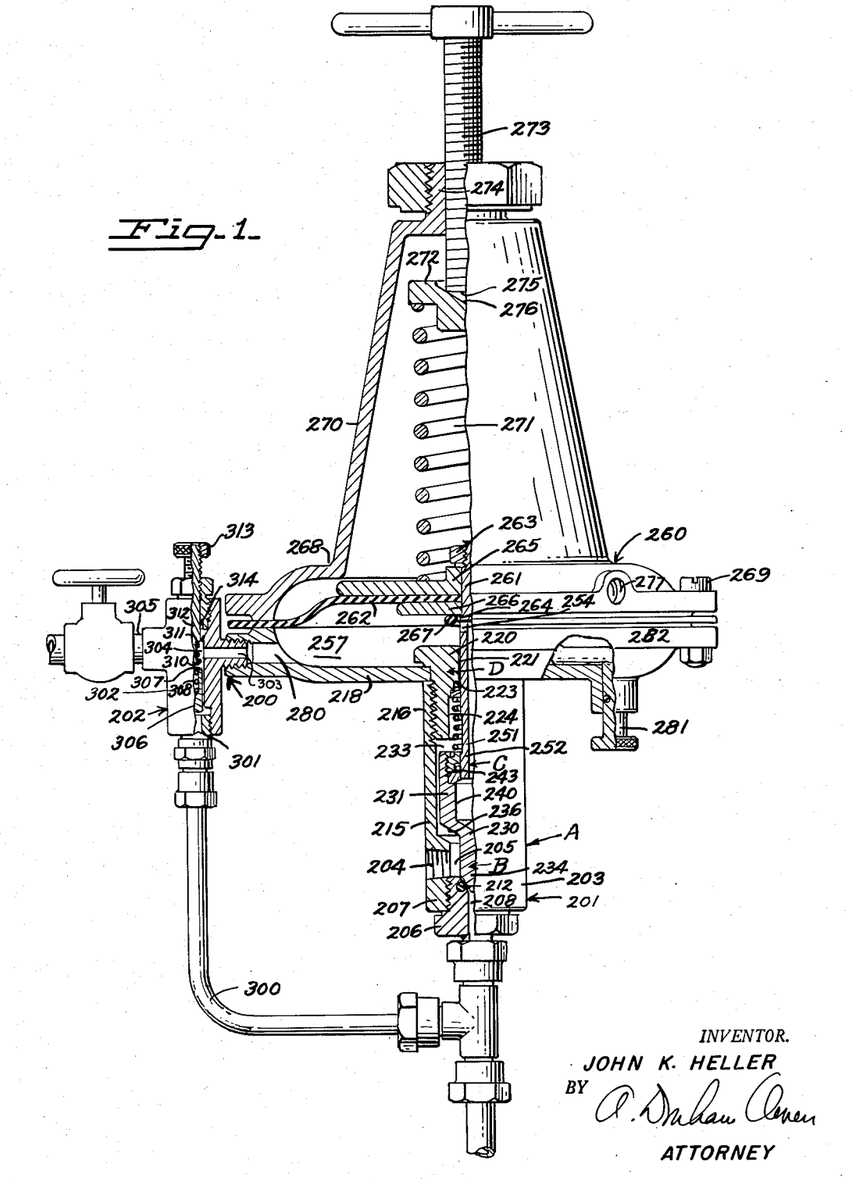
Fig. 1 is a view in elevation and partly in section of the invention, comprising an output control valve having one portion that controls the pressure at which the valve opens and another portion that controls the pressure at which the valve closes. The valve is here shown in its fully closed position.

The valve 201 is operated by movement of the pilot valve C and by the pressure of the fluid whose flow is controlled by the valve 201. This pressure acts in different directions on areas of the valve B which differ in size. Fig. 1 shows the valve in its "off" position. The main valve 230 is being held closed by the spring 246 and by the high pressure in the chamber 233 acting over the wider upper areas 237 and 247, as compared with the same pressure in the inlet passage 204 acting on the smaller lower area 236, where the portions 231 and 234 join. At the same time the pilot valve stem 250 is being held in its uppermost or closed position by the diaphragm 262 because the output pressure in the lower diaphragm chamber 257 is greater than the downward pressure of the spring 271. In this position the two O-rings 243 and 249 are holding the high pressure sealed in the chamber 233 above the main valve 230, the fluid from the inlet 204 reaching this chamber 233 by passing through the clearance 232. The high pressure is acting in opposite directions on the two O-rings 243 and 249 and is therefore balanced insofar as it might effect the movement of the pilot valve stem 251 and the diaphragm 262.

Figure 2:
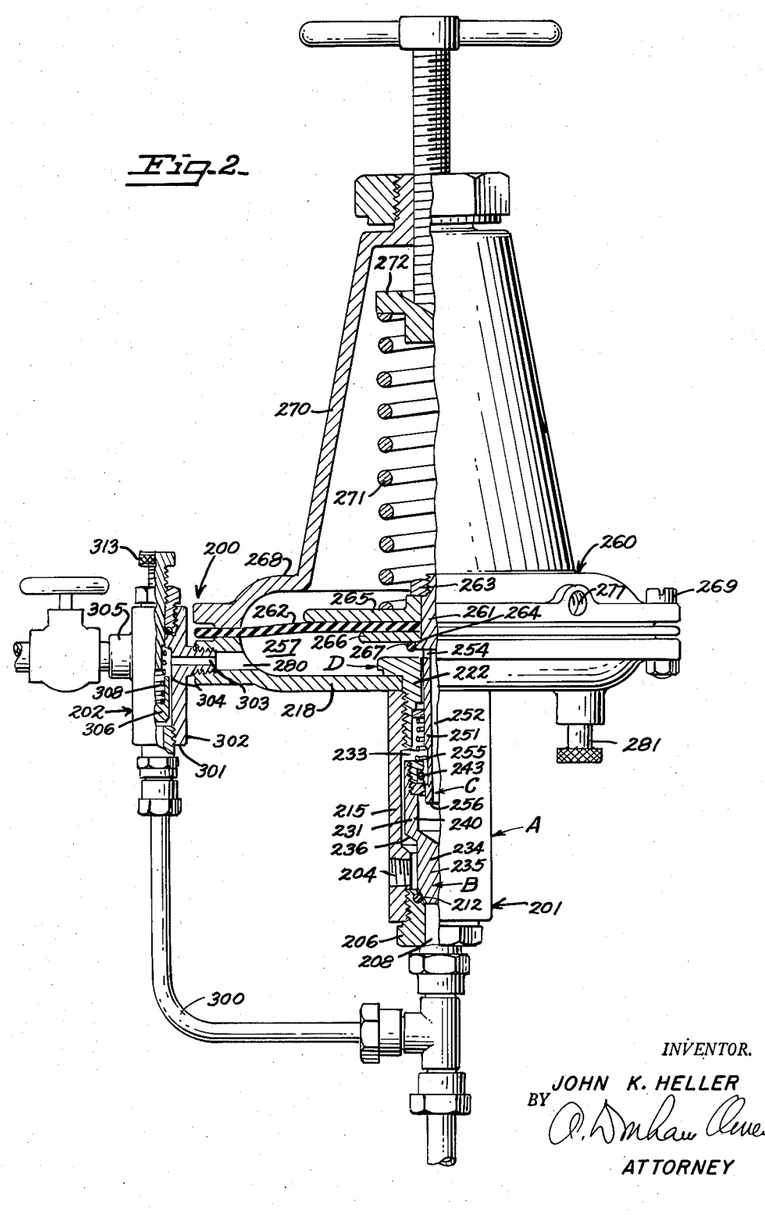
Fig. 2 is a view similar to Fig. 1, with the main valve still closed, but the pilot valve partly open.
Figure 3:
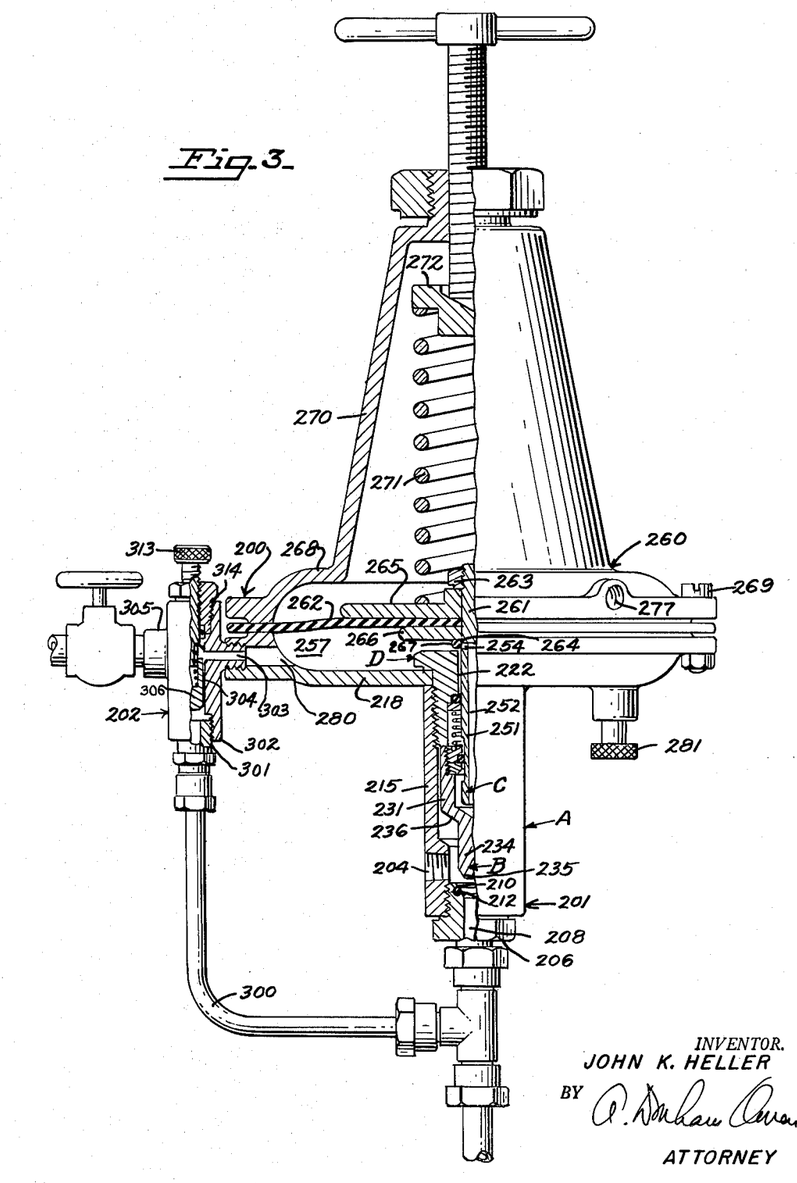
Fig. 3 is a view similar to Fig. 2, with the main valve fully opened as a result of the pressure differential set up by the movement of the pilot valve.

When the output pressure drops, the diaphragm 262 is urged downwardly by the spring 271 and carries the pilot valve stem 251 down, so that its lower end 253 moves out into the wide portion of the chamber 240 formed in the main valve (Fig. 2). As soon as the wide end portion 256 of the pilot valve stem 251 clears the lower end of the O-ring 243 sufficiently so that the flow rate of the fluid past the O-ring 243 is greater than the flow of fluid up the clearance 232, the fluid pressure in the chamber 233 drops, and soon the high pressure acting upon the lower shoulder 236 of the main valve 230 starts to move the valve 230 upward. As it moves upward, the clearance around the O-ring 243 is further increased, resulting in a still higher pressure differential, so that the main valve 230 moves promptly to its utmost or full-open position shown in Fig. 2.

Fluid will continue to flow up the clearance 232 into the chamber 233, down around the pilot valve stem 251 and up through the pilot valve passageway 252 into the lower diaphragm chamber 257 and into the outlet 280 into the output system. At the same time the main flow of fluid will be the high pressure flow directly from the inlet 204 into the outlet opening 208.

Figure 4:
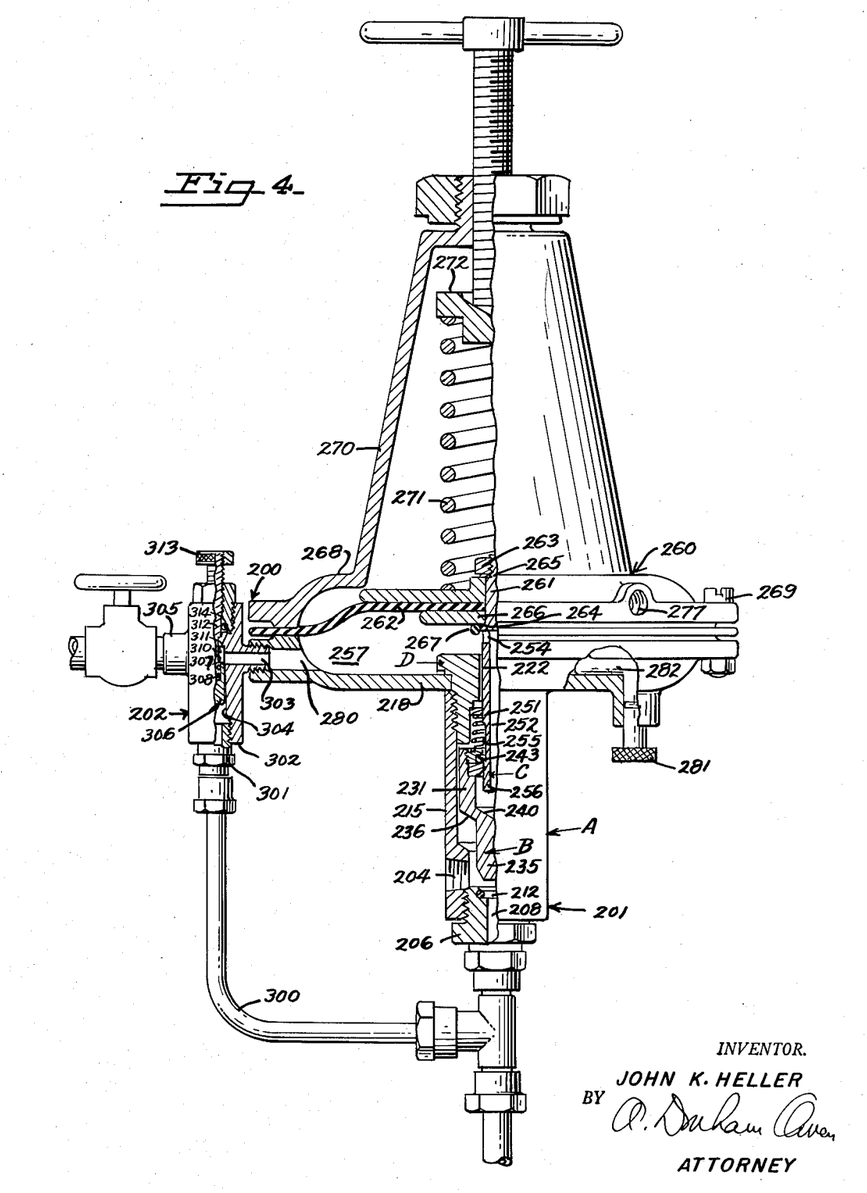
Fig. 4 is a view similar to Fig. 3, with the main valve still fully open, but with the pilot valve beginning to be closed. From here the main valve moves automatically to its Fig. 1 position.

When the pressure builds up inside the chamber 257, the diaphragm 262 is finally urged upwardly against the spring 271 and carries the pilot valve stem 271 up, so that its lower end portion 256 approaches the lower O-ring 243, thereby restricting the flow of the fluid at this point. (See Fig. 4.) When this restriction reaches the point where the flow is less than the flow through the clearance 232, the pressure in the chamber 233 increases and soon the main valve 230 starts to move downward, urged by the valve spring 246 and by the difference of areas on its upper surfaces 237 and 247 and its lower surface 236. Since this downward movement increases the restriction of the outward flow through the pilot valve 250, the pressure above the main valve 230 builds up very fast and the valve 230 closes promptly and completely.

Off-pressure adjustment valve 202

The valve 201 has an inherent range of pressures between "on" and "off", this inherent range depending on the stiffness of the diaphragm spring 271, on the stiffness of the diaphragm 262, and on the sliding friction of the two O-rings 243 and 249 against the pilot valve stem 251. This range is usually considerably greater than is desirable in maintaining a constant outflow pressure, and therefore the "off-pressure" adjustment valve 202 is provided.

As stated before, when the valve 201 is in its "on" or running position there is a flow of high pressure through the pilot valve stem 251 into the lower diaphragm chamber 257 and from there out through the port 280 into the output system. The "off-pressure" adjustment valve 202 operates by throttling the flow through the port 280, so that the pressure under the diaphragm 262 can be built up higher than the actual output system pressure, while remaining proportional to that pressure. At the same time, the "off-pressure" adjustment valve assures that the throttling takes place only while the output control valve 200 is on. When the valve 200 is "off", the passage 280 to the output system, should be free so that the control will respond promptly to a drop in the output system pressure.

A conduit 300 leads from the valve outlet 208 to the "off-pressure" adjustment valve 202, entering at the lower end 301 of a generally cylindrical hollow housing 302. A transverse opening 303 extends into the interior passage 304 from the outlet 280 from the diaphragm lower chamber 257, and an outlet passage 305 extends from the chamber 304 transversely outwardly to the output system, there preferably being a single output system into which all outlet conduits lead.

A piston member 306 is slidably mounted in the cylinder 304. The upper end 307 of the piston 306 is cupped to receive one end of a spring 308. The upper end of the spring 308 is seated around a cylindrical portion 310 and against a shoulder 311 of a valve stem 312 which is threaded into the housing 302, so that the tension of the spring 308 can be adjusted by means of a knurled nut 313 at the upper end of the stem 312. An O-ring sealing member 314 may be provided between the stem 312 and the housing 302 to prevent leakage between them.

When the pressure is "off," the spring 308 urges the piston 306 down towards the bottom 301 of the housing 302, so that the port 303 is fully uncovered, and there is no throttling of the flow from the lower diaphragm chamber 257 directly to the output system. When the output control is "on," the piston 306 is subjected to the high pressure of the fluid coming from the conduit 300 and is moved upwardly against the pressure of the spring 308. The upward motion of the piston 306 is limited by the end 310 of the "off-valve" stem 312 so that it cannot completely cut off the port 303, but it does progressively cover portions of the port 303 and thereby more or less throttles the flow out of the lower diaphragm chamber 257 to the output system. Screwing the stem 312 in, raises the "off-pressure" by reducing the throttling action, while screwing the stem out lowers the "off-pressure" by increasing the throttling action.

Safety features

The valve of this invention is provided with several safety features. If the diaphragm spring 271 breaks, the output pressure will force the diaphragm 262 upwardly, thereby closing the pilot valve 250 so that the main valve 230 will be held closed. The friction of the two O-rings 243, 249 on the pilot valve stem 251 will retain the pilot valve 250 in closed position until the diaphragm spring 271 is replaced.

If the diaphragm 262 itself breaks, the diaphragm spring 271 will force the failure seat 267 into close contact with the top surface of the valve guide plug 220 and therefore the high pressure is sealed in above the main valve 230, so that the valve 230 will be forced closed even though the pilot valve 250 is down in its lower position. The same thing happens if the output system pressure drops too low.

The starting button 281 is used for initiating operation when the output system has insufficient pressure (see Fig. 5). When the button 281 is pushed upward the starting lever 282 lifts the diaphragm washer 266 and the failure seat 267, allowing the high pressure in the chamber 233 and in the stem passage 252 to flow into the chamber 257. The relieving of this pressure opens the main valve 230, and it will remain open until the output pressure builds up to the value called for by the pressure of the diaphragm spring 271. However, the starting button 281 cannot cause the output pressure to rise beyond this value; so it is impossible to overstrain the diaphragm 262 accidentally or to increase the pressure in the output system too much by using the starting button 281.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A diaphragm-controlled, pilot-actuated, quick-opening and quick-closing valve for fluids in which the fluid's pressure is utilized to accelerate the opening and closing of the valve, including in combination: a diaphragm housing; a diaphragm dividing said housing into first and second chambers; a generally tubular valve housing secured to said diaphragm housing and having an axial passage therethrough extending from said first chamber at one end to an outlet opening at its other end with a smooth-bored valve cylinder therebetween and a generally conical valve seat adjacent said outlet opening, said housing having generally radial inlet means adjacent said valve seat; an outlet conduit connected to said outlet opening and to said first diaphragm chamber; a plug member closing said housing at its end adjacent said diaphragm and having an axial guide passage therethrough; a main valve member slidable axially in said housing axial passage toward and away from said valve seat, said member having a solid end nose portion adapted to close against said seat and a hollow piston portion slidable in said cylinder, said piston having a larger exterior diameter than said nose with a shoulder where they join so that the pressure of said fluid at the inlet against said shoulder tends to move said valve away from said outlet opening and hold it away, said hollow piston portion having an axial passage extending in from its outer end, said passage having a restricted portion between said outer end and a wider chamber portion; means for conducting fluid at all times from said inlet into said cylinder between the outer end of said piston and said plug, the pressure of the fluid therein against the outer end portions of said piston tending to close said valve member against said seat; a hollow pilot valve member having a solid stem portion secured to said diaphragm for movement therewith and a tubular stem portion extending through said plug axial guide passage with an enlarged end portion normally adapted to seal against said restricted piston passage, the passage through said pilot valve member leading from said wider chamber in said main valve into said first chamber; and means in said second chamber for biasing said diaphragm; whereby when pressure in said first diaphragm chamber drops, said pilot valve is moved toward said valve seat, and its enlarged end portion moves into said wider chamber, thereby losing contact with said main valve member and permitting the flow of fluid from said cylinder into said wider chamber, then through said pilot valve to said first diaphragm chamber, causing a reduction of pressure in the passage area lying between said plug and said main valve member, thereby enabling the undiminished pressure tending to urge said main valve away from its seat to overcome the diminished force in the opposite direction and open said main valve, the movement of said valve away from its seat widening the passage between said main valve and said pilot valve thereby further increasing the pressure difference and accelerating the opening of said main valve, and whereby when the pressure in said first diaphragm chamber rises said pilot valve is moved in the opposite direction, restricting the flow of fluid out from the space between said piston and said plug, thereby building up pressure that tends to move said main valve toward its seat, this movement causing further restriction and further increase in the pressure tending to close said valve and thereby accelerating the closure of said valve.

2. The valve of claim 1 in which there is a spring compressed between said main valve and said plug, tending to urge said main valve toward its closed position.

3. The valve of claim 1 in which there is a lever in said first diaphragm chamber with a control member extending out through said diaphragm housing, whereby pressure may be urged manually against said diaphragm when it is collapsed to open said pilot valve and permit sufficient pressure to build up in said first diaphragm chamber to enable automatic operation of said valve.

4. A diaphragm-controlled, pilot-actuated, quick-opening and quick-closing valve for fluids in which the fluid's pressure is utilized to accelerate the opening and closing of the valve, including in combination: a diaphragm housing; a diaphragm dividing said housing into first and second chambers; a generally tubular valve housing secured to said diaphragm housing and having an axial passage therethrough extending from said first chamber at one end to an outlet opening at its other end with a smooth-bored valve cylinder therebetween and a generally conical valve seat adjacent said outlet opening, said housing having generally radial inlet means adjacent said valve seat; an outlet conduit connected to said outlet opening and to said first diaphragm chamber; a plug member closing said housing at its end adjacent said diaphragm and having an axial guide passage therethrough; a main valve member slidable axially in said housing axial passage toward and away from said valve, said member having a solid end nose portion adapted to close against said seat and a hollow piston portion slidable in said cylinder, said piston having a larger exterior diameter than said nose with a shoulder where they join so that the pressure of said fluid at the inlet against said shoulder tends to move said valve away from said outlet opening and hold it away, said hollow piston portion having an axial passage extending in from its outer end, said passage having a restricted portion between said outer end and a wider chamber portion; means for conducting fluid at all times from said inlet into said cylinder between the outer end of said piston and said plug, the pressure of the fluid therein against the outer end portions of said piston tending to close said valve member against said seat; a hollow pilot valve member having a solid stem portion secured to said diaphragm for movement therewith and a tubular stem portion extending through said plug axial guide passage with an enlarged end portion normally adapted to seal against said restricted piston passage, the passage through said pilot valve member leading from said wider chamber in said main valve into said first chamber; means in said second chamber for biasing said diaphragm, and a sealing member provided around said pilot valve just above the juncture of its solid and tubular stem portions to engage said plug when said diaphragm collapses and seal said pilot valve passage from said first diaphragm chamber; whereby when pressure in said first diaphragm chamber drops, said pilot valve is moved toward said valve seat, and its enlarged end portion moves into said wider chamber, thereby losing contact with said main valve member and permitting the flow of fluid from said cylinder into said wider chamber, then through said pilot valve to said first diaphragm chamber, causing a reduction of pressure in the passage area lying between said plug and said main valve member, thereby enabling the undiminished pressure tending to urge said main valve away from its seat to overcome the diminished force in the opposite direction and open said main valve, the movement of said valve away from its seat widening the passage between said main valve and said pilot valve thereby further increasing the pressure difference and accelerating the opening of said main valve, and whereby when the pressure in said first diaphragm chamber rises said pilot valve is moved in the opposite direction, restricting the flow of fluid out from the space between said piston and said plug, thereby building up pressure that tends to move said main valve toward its seat, this movement causing further restriction and further increase in the pressure tending to close said valve and thereby accelerating the closure of said valve.

5. A diaphragm-controlled, pilot-actuated, quick-opening and quick-closing valve for fluids in which the fluid's pressure is utilized to accelerate the opening and closing of the valve, including in combination: a diaphragm housing; a diaphragm dividing said housing into first and second chambers; a generally tubular valve housing secured to said diaphragm housing and having an axial passage therethrough extending from said first chamber at one end to an outlet opening at its other end with a smooth-bored valve cylinder therebetween and a generally conical valve seat adjacent said outlet opening, said housing having generally radial inlet means adjacent said valve seat; an outlet conduit connected to said outlet opening and to said first diaphragm chamber; a plug member closing said housing at its end adjacent said diaphragm and having an axial guide passage therethrough; a main valve member slidable axially in said housing axial passage toward and away from said valve, said member having a solid end nose portion adapted to close against said seat and a hollow piston portion slidable in said cylinder, said piston having a larger exterior diameter than said nose with a shoulder where they join so that the pressure of said fluid at the inlet against said shoulder tends to move said valve away from said outlet opening and hold it away, said hollow piston portion having an axial passage extending it from its outer end, said passage having a restricted portion between said outer end and a wider chamber portion; means for conducting fluid at all times from said inlet into said cylinder between the outer end of said piston and said plug, the pressure of the fluid therein against the outer end portions of said piston tending to close said valve member against said seat; a hollow pilot valve member having a solid stem portion secured to said diaphragm for movement therewith and a tubular stem portion extending through said plug axial guide passage with an enlarged end portion normally adapted to seal against said restricted piston passage, the passage through said pilot valve member leading from said wider chamber in said main valve into said first chamber; means in said second chamber for biasing said diaphragm; means for sealing between said diaphragm and said pilot valve to close off said first chamber when said diaphragm is collapsed; and a lever in said first diaphragm chamber with a control member extending out through said diaphragm housing, whereby pressure may be urged manually against said diaphragm when it is collapsed to open said pilot valve and permit sufficient pressure to build up in said first diaphragm chamber to enable automatic operation of said valve; whereby when pressure in said first diaphragm chamber drops, said pilot valve is moved toward said valve seat, and its enlarged end portion moves into said wider chamber, thereby losing contact with said main valve member and permitting the flow of fluid from said cylinder into said wider chamber, then through said pilot valve to said first diaphragm chamber, causing a reduction of pressure in the passage area lying between said plug and said main valve member, thereby enabling the undiminished pressure tending to urge said main valve away from its seat to overcome the diminished force in the opposite direction and open said main valve, the movement of said valve away from its seat widening the passage between said main valve and said pilot valve thereby further increasing the pressure difference and eccelerating the opening of said main valve, and whereby when the pressure in said first diaphragm chamber rises said pilot valve is moved in the opposite direction, restricting the flow of fluid out from the space between said piston and said plug, thereby building up pressure that tends to move said main valve toward its seat, this movement causing further restriction and further increase in the pressure tending to close said valve and thereby accelerating the closure of said valve.

6. A diaphragm-controlled, pilot-actuated, quick-opening and quick-closing valve for fluids in which the fluid's pressure is utilized to accelerate the opening and closing of the valve, including in combination: a diaphragm housing; a diaphragm dividing said housing into first and second chambers; a generally tubular valve housing secured to said diaphragm housing and having an axial passage therethrough extending from said first chamber at one end to an outlet opening at its other end with a smooth-bored valve cylinder therebetween and a generally conical valve seat adjacent said outlet opening, said housing having generally radial inlet means adjacent said valve seat; an outlet conduit connected to said outlet opening and to said first diaphragm chamber; a throttle valve opposite the juncture of said outlet conduit and said first diaphragm chamber, and connected to said outlet conduit, said throttle valve comprising a cylinder, and a valve movable therein to open fully and to partially close the communication between said conduit and said first diaphragm chamber, so as to change the effective cut-off pressure of said main valve; a plug member closing said housing at its end adjacent said diaphragm and having an axial guide passage therethrough; a main valve member slidable axially in said housing axial passage toward and away from said valve, said member having a solid end nose portion adapted to close against said seat and a hollow piston portion slidable in said cylinder, said piston having a larger exterior diameter than said nose with a shoulder where they join so that the pressure of said fluid at the inlet against said shoulder tends to move said valve away from said outlet opening and hold it away, said hollow piston portion having an axial passage extending in from its outer end, said passage having a restricted portion between said outer end and a wider chamber portion; means for conducting fluid at all times from said inlet into said cylinder between the outer end of said piston and said plug, the pressure of the fluid therein against the outer end portions of said piston tending to close said valve member against said seat; a hollow pilot valve member having a solid stem portion secured to said diaphragm for movement therewith and a tubular stem portion extending through said plug axial guide passage with an enlarged end portion normally adapted to seal against said restricted piston passage, the passage through said pilot valve member leading from said wider chamber in said main valve into said first chamber; and means in said second chamber for biasing said diaphragm; whereby when pressure in said first diaphragm chamber drops, said pilot valve is moved toward said valve seat, and its enlarged end portion moves into said wider chamber, thereby losing contact with said main valve member and permitting the flow of fluid from said cylinder into said wider chamber, then through said pilot valve to said first diaphragm chamber, causing a reduction of pressure in the passage area lying between said plug and said main valve member, thereby enabling the undiminished pressure tending to urge said main valve away from its seat to overcome the diminished force in the opposite direction and open said main valve, the movement of said valve away from its seat widening the passage between said main valve and said pilot valve thereby further increasing the pressure difference and accelerating the opening of said main valve, and whereby when the pressure in said first diaphragm chamber rises said pilot valve is moved in the opposite direction, restricting the flow of fluid out from the space between said piston and said plug, thereby building up pressure that tends to move said main valve toward its seat, this movement causing further restriction and further increase in the pressure tending to close said valve and thereby accelerating the closure of said valve.

7. The valve of claim 6 in which said throttle valve member is normally spring-urged away from its throttling position.

References Cited in the file of this patent

UNITED STATES PATENTS

| 341,295 | Westinghouse | May 4, 1886 |
| 1,807,191 | Boyle | May 26, 1931 |
| 2,690,759 | Walters | Oct. 5, 1954 |
| 2,932,613 | Grove | Mar. 3, 1956 |

FOREIGN PATENTS

| 885,626 | France | Sept. 21, 1943 |